United States Patent Office 2,721,806
Patented Oct. 25, 1955

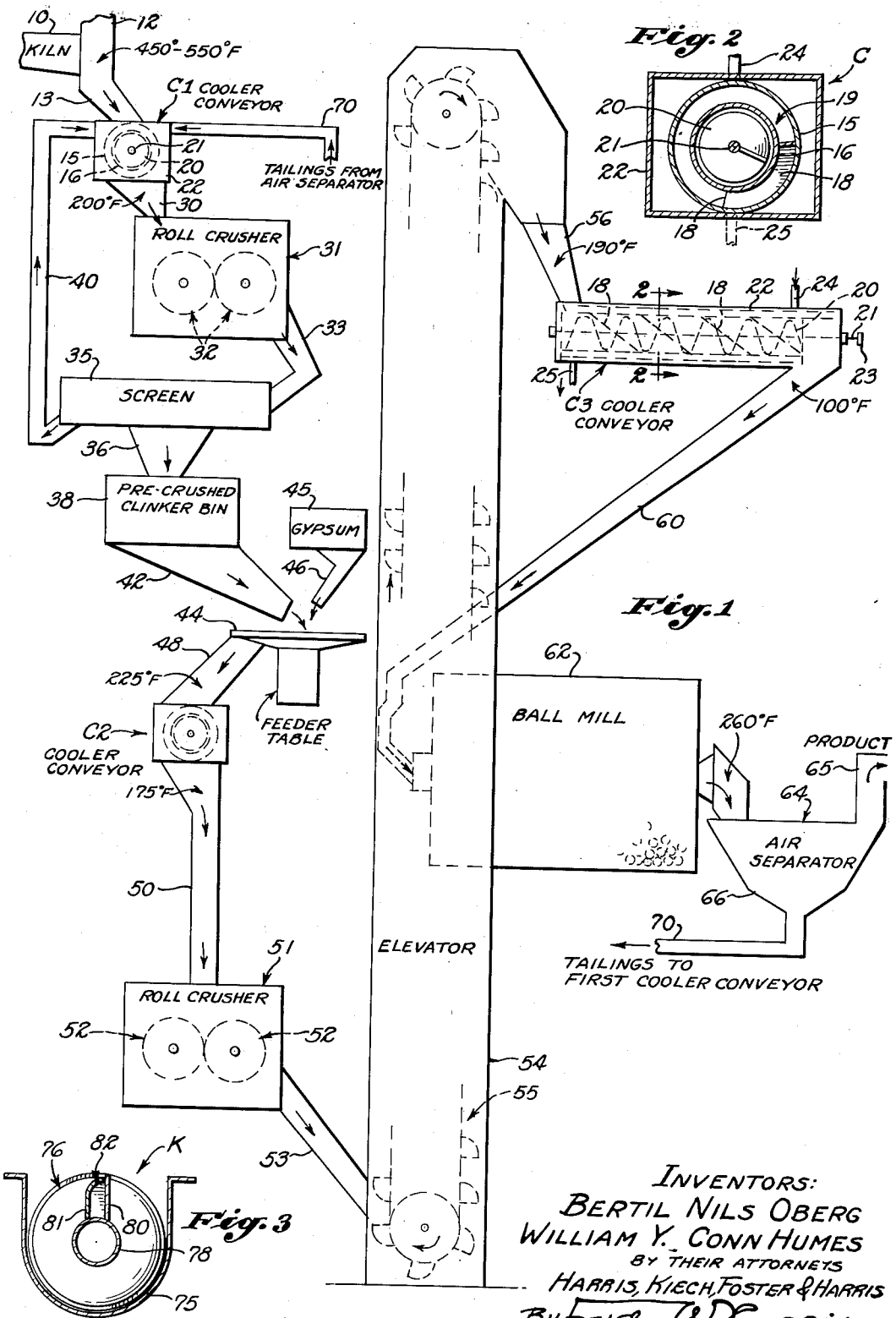

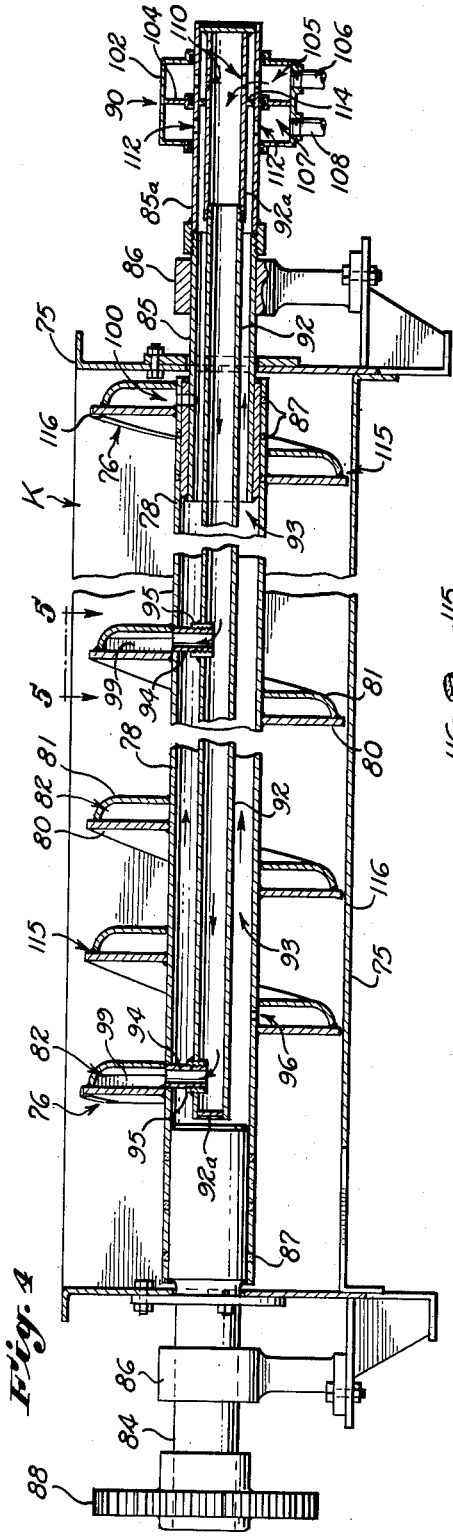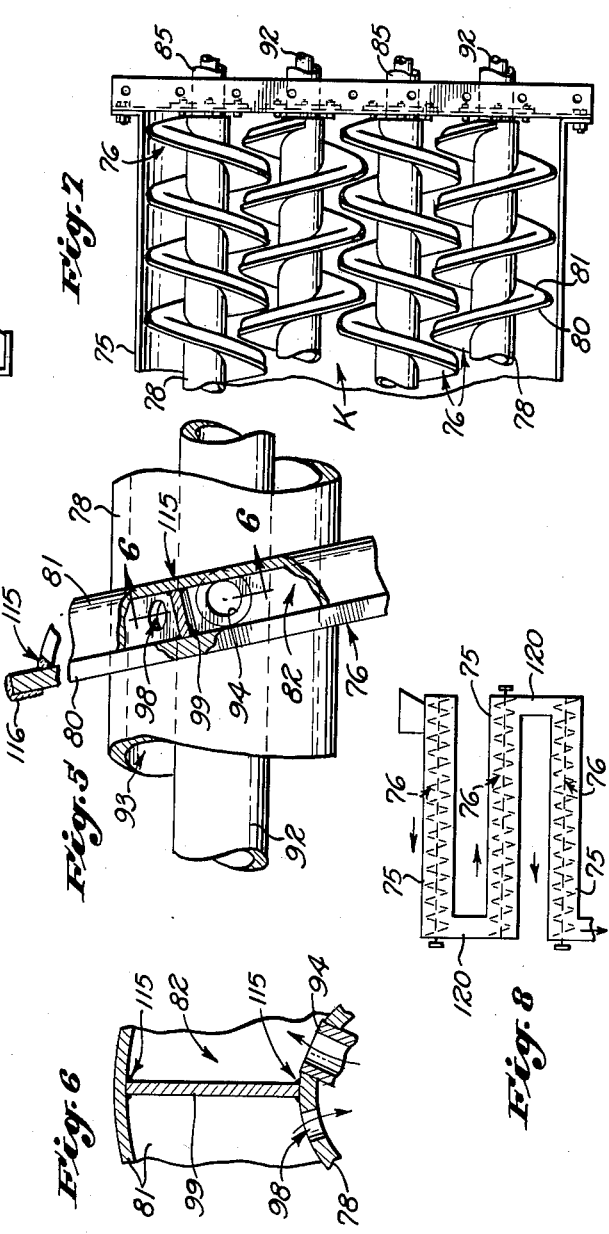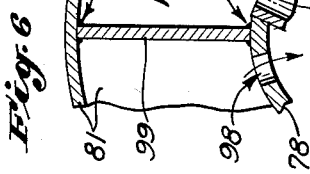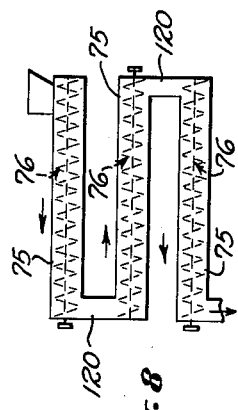

2,721,806

COOLING METHOD AND APPARATUS FOR PROCESSING CEMENT CLINKER

Bertil Nils Oberg, Tehachapi, and William Y. Conn Humes, Monolith, Calif., assignors to Monolith Portland Cement Company, Los Angeles, Calif., a corporation of Nevada Application April 5, 1952, Serial No. 280,744

4 Claims. (Cl. 106—100)

This invention relates to the processing of hot cement clinker which is to be delivered to crushing and grinding units of commercial cement manufacturing plants.

A general object of the invention is to provide a clinker-treating method and apparatus which will facilitate cement grinding and will yield a superior powdered product.

According to prior practice, hot cement clinker has been passed from a sintering or calcining kiln to a cooler of kiln-like construction or to a cooler using so-called air-quenching devices employing a slowly moving grate with a blast of cold air. Thereupon the clinker so treated is crushed in a roller crusher and then ground. Such cooling methods and apparatus do not yield a sufficiently cold product and such hot product as has heretofore been presented to the final grinder does not in turn yield as satisfactory a ground final product as is desirable.

It is therefore a further object of the invention to provide a method and apparatus for adequate cooling of clinker so that it may be ground with the greatest possible efficiency to an optimum product, which is accomplished only by far lower temperatures than heretofore employed in commercial practice.

Another object of the invention is to provide a processing method and apparatus by which residual heat from the kiln may be adequately removed from the clinker, and by which heat imparted during the subsequent necessary crushing operations may be removed.

An additional object of the invention is to provide cooling means, especially cooling conveyors, which may be employed between clinkering and the various crushing and grinding steps, through the medium of which the high cooling efficiency of cold water may be readily and advantageously used.

A further object is to cool and convey the clinker simultaneously, as by means of the mentioned cooling conveyors.

It is a still further object of the invention to rely upon inherent heat absorption characteristics of previously cooled and crushed or ground oversize material which is screened out or otherwise separated and returned to an earlier stage in the system, and thereby to cool the hotter clinker at any appropriate earlier stage.

Other objects and advantages of the present improvement, together with the various features thereof, will become apparent to those skilled in the art upon reference to the following specification and the accompanying drawings wherein certain embodiments of the generic invention are disclosed.

In the drawings:

Fig. 1 is a diagrammatic representation of various units of a desirable clinker-processing system by which an optimum final, ground cement product may be obtained;

Fig. 2 is a cross-sectional view of a possible form of water cooled cooling conveyor employed at different spaced positions in the system;

Fig. 3 is a cross-sectional view of a single screw of a preferable type of cooling conveyor also using water as a cooling medium;

Fig. 4 is primarily a longitudinal section, of a mounted screw of the type of Fig. 3, parts being shown in elevation;

Fig. 5 is an edge detail indicated by the line 5—5 of Fig. 4, with portions broken away to indicate the arrangement of water passages;

Fig. 6 is a transverse sectional detail taken on the line 6—6 of Fig. 5;

Fig. 7 is a plan view of plural conveyors arranged in operative, conveying relationship; and Fig. 8 is a diagrammatic elevation of a cooling conveyor combination for this invention.

The diagrammatic showing of Fig. 1 indicates a conventional clinker kiln 10 in which the usual constituents for the production of Portland cement and the like are calcined or sintered to yield a conventional or preferred type of cement clinker. This kiln 10 is shown as discharging into a common receiving hood 12 or the like provided with a discharge chute 13 by which the hot clinker is introduced into one end of a cooler conveyor C-1 in which water is employed as a cooling medium by indirect heat exchange. One construction for the cooler conveyor C-1 is that of the cooling device C illustrated in cross section in Fig. 2, this same construction being employed if desired for an intermediate cooler conveyor C-2 and a succeeding cooler conveyor C-3. The side elevation of each of these coolers and of the mentioned cooling device C is indicated by the elevational showing of the cooler conveyor C-3 at the upper right of Fig. 1. By these means hot clinker is cooled as it is conveyed.

This particular form of cooler may include a water jacket formed by two concentric cylindrical shells 15 and 16 which are spaced by a helical vane 18 extending between the ends of the cooler and forming a helical chamber 19. Within the inner shell 16 there is provided a helical conveyor 20 fixed upon a suitable drive shaft 21. The cooling shell 15 may be contained within an outer casing or framework 22, if required, from which the drive shaft 21 of the helical conveyor 20 extends to receive a drive pulley 23 or the like as seen at the right of the cooler conveyor C-3 in Fig. 1. A cold water supply pipe 24 feeds cold water into the top of the helical cooling chamber 19 at the discharge end of the cooler, and a warm water discharge pipe 25 conducts the water from the lower side of the feed end of the cooler. By reason of the construction of each cooler conveyor, as described, cold water contacts the corresponding wall of the inner shell 16, the inner wall of which is in turn in contact with clinker being moved therethrough. Thus, the high cooling efficiency of water is imparted to the traveling clinker by indirect heat exchange through the shell 16.

Referring again to the clinker supplied to the first conveyor C-1, the partially cooled clinker having reached the discharge end of the conveyor is conducted by a discharge chute 30 to a conventional roll crusher 31, or the like, which may contain two conventional crushing rolls 32. The discharge from the roll crusher 31 is fed by any suitable chute 33 to a screening device 35. The fines from the screening device 35 are discharged, as by means of a hopper 36 to a precrushed-clinker bin 38, for example. The oversize material is discharged from the screening device 35 and is conducted by any conveying means 40 back to the feed end of the cooling conveyor C-1. These oversize portions having been cooled somewhat serve thereby to reduce the temperature of hot clinker being fed from the kiln 10 to the conveyor C-1. The precrushed clinker in the bin 38 is appropriately supplied, as by a chute 42 to a conventional mill feed table 44 whereon the clinker is conventionally commingled with calcium sulfate in the form of gypsum supplied from a storage 45 as through a discharge chute 46.

The cooled, precrushed clinker properly admixed with gypsum is now conducted from the mill feed table 44 by any conduit means 48 to a second cooler conveyor C–2, wherein the clinker-gypsum mixture is further cooled. By these means, much of the heat of friction imparted by the roll crusher 31 is removed, but, of course, much residual heat from the kiln 10 still remains. The still warm discharge from the cooler conveyor C–2 is then passed, as by a chute 50, to a second roll crusher 51 which may be like the first roll crusher 31 and contain appropriate rolls 52. The crushed clinker is shown as being discharged through a chute 53. Inasmuch, as in the particular type of apparatus illustrated, clinker travel has been by gravity, it will be necessary at some stage in practical operation to elevate the crushed clinker for subsequent operations. For this reason the discharge chute 53 leads into the lower end of an elevator housing 54 provided with an endless bucket conveyor 55 which discharges at the top of the housing 54, as through a chute 56, to the final cooler conveyor C–3. In this cooler conveyor the temperature of the crushed clinker is lowered to a desirable or optimum temperature for grinding, such as between about 110° F. and about 85° F. This cooler not only removes heat of friction generated in the second roll crusher 51, but it also removes the last of the objectionable residual heat from the kiln 10.

The properly cooled, crushed clinker is now fed by any appropriate conduit means 60 to the feed end of a conventional tube mill 62 such as a ball mill. The discharge from the mill 62 may be the final product desired, but in practice it is preferred that the discharge from the mill 62 be passed to an air separator 64, from which the final product is passed to storage as by way of a conduit 65. The tailings or oversize materials recovered from the hopper 66 at the bottom of the air separator 64 are then conducted by an appropriate conduit or conveyor 70 to the feed end of the initial cooler conveyor C–1 whereby these tailings, like the oversize material supplied from the screening device 35 through the conveying means 40, serve to impart an initial cooling to the hot clinker being discharged from the kiln 10.

Instead of the more simple type of cooler conveyor C of Fig. 2, it is commonly desirable to use a cooler conveyor such as indicated at K in Figs. 3 to 7 which comprises a shell 75 in which is disposed a helical conveyor blade 76 on a hollow rotary shaft 78, the helical blade 76 being formed of two spaced wall members 80 and 81 providing between them a helical water passage 82 which passes water from the vicinity of the discharge end of the conveyor back toward the feed end thereof. In this case the crushed clinker moves in contact with the walls of the blade 76 and hence in indirect heat exchange with cooling water in the helical passage 82.

From the standpoint of the operation of the system as a whole as illustrated in Figs. 1 to 3, it will be apparent that the crushed clinker supplied to the ball mill 62 is cooled to an adequate degree by stages which provide also for absorption of friction heat imparted by the roll crushers 31 and 51. This arrangement of crushers not only avoids the necessity of adequately crushing the clinker in one operation such as in the crusher 31, with incident generation of a large quantity of friction heat, but it provides for the introduction of gypsum at an intermediate stage, and, in view of the second cooler conveyor C–2, facilitates optimum final crushing of the thus cooled, precrushed clinker in the second crusher 51. This cooling of the clinker for its final crushing facilitates such final crushing in much the same way that adequate cooling facilitates the final grinding. By further cooling, in the third cooler conveyor C–3, the crushed clinker delivered by the crusher 51 is reduced to an optimum grinding temperature for the final pulverizing operation occurring in the mill 62. In view of this optimum grinding temperature, the final product is ground under the best conditions, is therefore ground more efficiently, and is itself a better product for subsequent use in conventional ways. This is particularly true when any oversize in the product from the mill 62 is recovered as tailings from the air separator 64 and returned to the head of the clinker processing system. Thus, the removal of these tailings not only serves to improve the recovered product, but it serves also to aid quicker cooling of the hot clinker taken from the kiln 10.

To illustrate the cooling effects, in a practical operation, temperatures will be successively lowered from a range such as about 500° F. to 450° F. at the discharge end of the kiln 10 to the above-mentioned range of about 110° F. to 85° F. when supplied to the grinding mill 62. When leaving the first cooler conveyor C–1, the temperature will ordinarily be in a range of about 250° F. to 185° F. When fed to the second cooler conveyor C–2, the temperature of the clinker will be within a range of about 260° F. to 195° F., and when leaving such conveyor, it may be about 205° F. to 140° F., the crushed clinker being fed to the last cooler conveyor C–3 at about 215° F. to about 150° F.

From the standpoint of the features of construction of the preferred type of cooler conveyor K of Figs. 3 to 8, the hollow rotary shaft 78 carrying the helical blade 76 is mounted in the shell 75 through the medium of a solid stub shaft 84 (Fig. 4) at the drive end of the conveyor and through the medium of a hollow stub shaft 85 at the opposite end, these stub shafts constituting trunnions mounted in bearings 86. The inner end of the solid stub shaft 84 is secured within the adjacent end of the hollow shaft 78 as through the medium of plug welds 87, and the outer end of the solid stub shaft 84 carries a driving gear 88. The hollow stub shaft 85 at the opposite end of the conveyor is provided at its outer end with an extension which enters a water ring 90 that serves for the conduction of cooling water to the conveyor. Within the hollow shaft 78 there is located an axially disposed water tube 92 which forms within the shaft 78 an annular return-water space 93. The inner end of the tube 92 is plugged as indicated at 92a, and is provided with a radially extending pipe nipple 94 whose inner end is threadedly mounted in a collar 95 fixed in a hole in the pipe 92, the outer end of the nipple 94 being welded in place in a corresponding hole in the hollow shaft 78 which communicates with the space 82 in the adjacent portion of the hollow, helical blade 76. At an intermediate point, another nipple 94 is similarly mounted, and such additional nipples 94 may be provided as is necessary for proper water handling for adequate cooling. If required, a discharge port 96 may be provided near the inner end of the blade 76 for the discharge of such cooling water into the inner end of the water passage 93 as may be necessary to cool the hollow shaft 78. The main body of water discharged through the inner nipple 94 passes through the hollow flights of the blades 76 and is eventually discharged from the water passage 82 into the space 93 as through a port 98, shown in Fig. 5, which is disposed adjacent a first partition wall 99 which separates the port 98 from an immediately adjacent nipple 94. At the outer end of the blade 76, there is provided another discharge port 100 which also discharges water from the passage 82 in the helical blade 76. By these means water introduced through the water pipe 92, after cooling the flights of the helical blade 76 and the interior of the hollow shaft 78, is discharged from the conveyor by way of the water ring 90. The water ring 90 is shown in the form of a circular box 102 having a middle partition 104 which forms a cold water-receiving chamber 105 supplied by a pipe 106 and a collecting chamber 107 which discharges warm water to an outlet pipe 108. As seen at the right of Fig. 4, passages 110 through a stub shaft extension 85a and through an extension 92a of the water pipe 92 conduct the cold water into the pipe 92, discharge passages 112 conducting warm water from the annular space 93 to the collecting chamber 107. An annular partition 114 between the extensions 85a and 92a prevents entering cold water from mingling with outgoing warm water in the annular chamber 93.

As seen in Figs. 4 and 5, the wall members 80 and 81 are secured to each other and to the hollow shaft 78 as by V-welds 115, and since the leading edge of the forward wall member 80 encounters the principal wear in the operation of the conveyor as it advances the clinker, its outer edge and adjacent advancing face are coated with a hard facing layer 116 which provides for these advancing edge portions a long life corresponding with the long life of the other portions of the conveyor. The overlap on the forward face of the wall member 80 should be appreciable, for example, in the case of a sixteen inch diameter conveyor, the overlap of the layer 116 may be from one to two inches.

While one of the described cooling conveyors 76, 78 may be used, it is very advantageous to employ them in pairs. In Fig. 7 two pairs are illustrated, but one pair in each location has been found highly advantageous. A very efficient type of cooling conveyor is illustrated in Fig. 8 wherein a vertical series of pairs of cooling conveyors 76, are shown as being positioned in respective shells 75, the discharge ends of the respective shells 75 communicating with the receiving ends of the lower shells 75 through the medium of vertical discharge legs 120.

From the standpoint of advancing the clinker in the various cooler conveyors C–1, C–2 and C–3, with maximum cooling efficiency by reason of indirect heat exchange with cold water being introduced into the helical passages 82, it has been found that the pitch of the helix is highly efficient when it equals approximately, or is slightly less than, half of the diameter of the screw. For example, in a screw sixteen inches in diameter, a pitch of seven and one-fourth inches has been highly effective. In practice, such pitch ordinarily would be between about seven inches and seven and one-half inches in a sixteen-inch screw, and may be as much as eight inches. Such a pitch provides excellent agitation and corresponding heat exchange contact, and the welded hard facing 116, as above described, fully meets the abrasion requirements of the leading edge of the forward wall member 80 of the helical blade 76. By such means highly efficient cooling is effected simultaneously with the conveying operation.

Where the screws are used in pairs, they are oppositely pitched and substantially intermeshed and are rotated in opposite directions, as indicated in Fig. 7, whereby to effect most efficient conveying of the clinker being processed.

It is to be understood that it is intended to cover all variations within the scope of the patent claims.

We claim as our invention:

1. Apparatus for processing hot cement clinker including: a horizontally extending cooling conveyor having an elongated horizontal hollow conveying screw providing an elongated helical passage for cooling water therethrough, thereby providing for indirect heat exchange between hot clinker and the water in said passage as the clinker is moved along the conveyor by said screw; means for feeding hot cement clinker from a cement kiln by gravity directly to said conveyor; a crusher disposed to receive cooled clinker from said conveyor; a second horizontally extending cooling conveyor having an elongated horizontal agitating hollow screw providing an elongated helical passage for cooling water therethrough to provide indirect heat exchange between clinker in such conveyor and water in the water passage thereof; means to discharge cooled clinker from said second conveyor by gravity directly to cement-reducing means; and cement-reducing means disposed to receive cooled clinker by gravity directly from the last mentioned discharge means.

2. Apparatus as in claim 1 including a second crusher and another horizontally extending cooling conveyor disposed ahead of said second crusher to receive crushed material from the first mentioned crusher, such other cooling conveyor having elongated horizontal screw conveyor means providing an elongated helical cooling water passage for indirect heat exchange between water in said passage and crushed clinker in said conveyor; and means for feeding cooled clinker from said other cooling conveyor by gravity directly to said second crusher.

3. A method of processing hot cement clinker which includes the successive steps of: removing hot cement clinker from a cement kiln; simultaneously conveying said hot clinker, agitating said hot clinker, and cooling said hot clinker by indirect heat exchange with cool fluid; crushing and screening said treated clinker; mixing said clinker from said screening step with gypsum; simultaneously conveying said clinker admixed with gypsum, agitating said clinker admixed with gypsum, and cooling said clinker admixed with gypsum by indirect heat exchange with cool fluid; crushing said clinker from said second simultaneous conveying step; simultaneously conveying said crushed clinker admixed with gypsum, and cooling said crushed clinker admixed with gypsum by indirect heat exchange with cool fluid; pulverizing said crushed clinker admixed with gypsum from said third simultaneous conveying step so as to obtain a powdered cement produce; removing larger particles from said powdered product; and mixing said larger particles with said hot cement clinker so as to aid in cooling said clinker from said cement kiln.

4. A method of processing hot cement clinker including the successive step of: removing hot cement clinker from a cement kiln; simultaneously conveying said hot clinker, agitating said hot clinker, and cooling said hot clinker by indirect heat exchange with cool fluid to a temperature approximately in the range of from about 250° F. to about 185° F.; crushing and screening said treated clinker; simultaneously conveying said clinker admixed with gypsum, agitating said clinker admixed with gypsum, and cooling said clinker admixed with gypsum by indirect heat exchange with cool fluid to a temperature in the range of from about 205° F. to about 185° F.; crushing said clinker admixed with gypsum from said second simultaneous conveying step; simultaneously conveying said clinker admixed with gypsum from second crushing step, agitating said clinker admixed with gypsum from said second crushing step, and cooling said clinker admixed with gypsum from said second crushing step by indirect heat exchange with cool fluid to a temperature below about 110° F.; and pulverizing said clinker admixed with gypsum from said third simultaneous conveying step so as to obtain a powdered cement product.

References Cited in the file of this patent

UNITED STATES PATENTS

| | | |
|---|---|---|
| 936,555 | McKenna | Oct. 12, 1909 |
| 1,091,097 | Valerius | Mar. 24, 1914 |
| 1,592,343 | Church | July 13, 1926 |
| 1,728,496 | Lindhard | Sept. 17, 1929 |
| 1,758,496 | Boynton | May 13, 1930 |
| 1,943,817 | Dunton | Jan. 16, 1934 |
| 2,006,939 | Breerwood | July 2, 1935 |
| 2,021,623 | Breerwood | Nov. 19, 1935 |
| 2,321,185 | Christian | June 8, 1943 |
| 2,375,487 | Newhouse | May 8, 1945 |
| 2,610,033 | Rietz | Sept. 9, 1952 |
| 2,609,149 | Posselt | Sept. 2, 1952 |

OTHER REFERENCES

Krabbe, I., "Cooling of Portland Cement," Rock Products, March 1950, pages 66 and 67.